No. 632,551. Patented Sept. 5, 1899.
R. DODSON.
HAME AND TRACE CONNECTOR.
(Application filed Dec. 14, 1898.)
(No Model.)
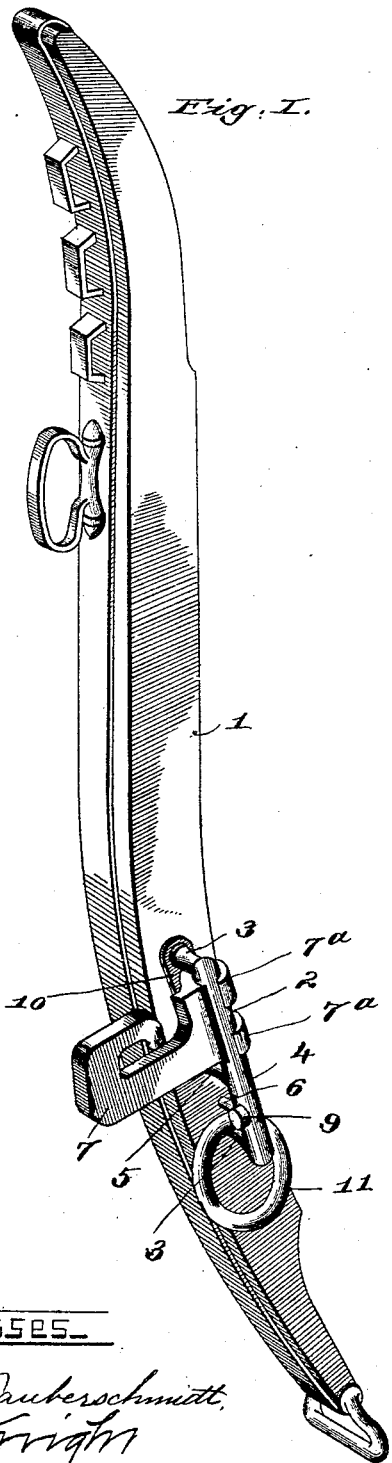
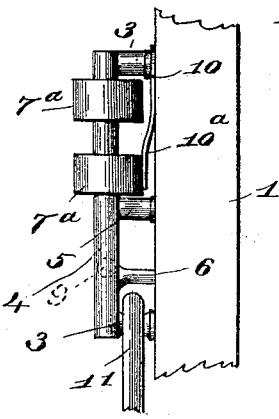
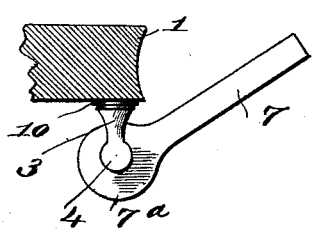
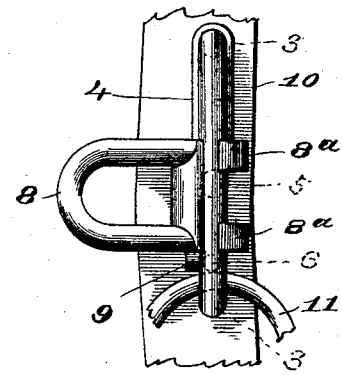
Witnesses
G. A. Rauberschmitt
E. S. Knight
Inventor
Roy Dodson
By Knight Bro
Attorneys
THE NORRIS PETERS CO., PHOTO-LITHO., WASHINGTON, D. C.

UNITED STATES PATENT OFFICE.

ROY DODSON, OF DALLAS, TEXAS.

HAME AND TRACE CONNECTOR.

SPECIFICATION forming part of Letters Patent No. 632,551, dated September 5, 1899.

Application filed December 14, 1898. Serial No. 699,195. (No model.)

*To all whom it may concern:*

Be it known that I, ROY DODSON, a citizen of the United States, residing at Dallas, in the county of Dallas and State of Texas, have invented certain new and useful Improvements in Hames, of which the following is a full, clear, and exact description, reference being had to the accompanying drawings, forming part of this specification.

My invention relates to a hame provided with a trace hook or loop so connected that they may be readily detached from the carrying-staple or shifted on the staple vertically to vary the draft purchase, as occasion may demand.

My invention consists in features of novelty hereinafter fully described, and pointed out in the claim.

Figure I is a side perspective of a hame equipped with my improvement. Fig. II is a front elevation of my improvement. Fig. III is a top view of the improvement with the hame shown in cross-section. Fig. IV is a side view showing a loop in place of the hook shown in Fig. I.

1 designates the hame proper, of common form.

2 designates a staple composed of upper and lower legs 3, that are suitably secured in the hame, and a rounded body portion 4. Intermediate of the legs 3 is a partition-leg 5. 6 is a supplemental division-leg located between the lower leg 3 and the partition-leg 5.

7 designates a hook, and 8 a loop, of a trace connection for application to the staple 2. These parts are substantially alike, except for their trace-receiving portions. The hooks and loops are each provided with curved tongues, (designated, respectively, by $7^a$ and $8^a$,) the tongues being separated to leave a space between them and being channeled to fit the rounded portion 4 of the staple 2 for attachment thereto and to turn thereon when placed in position. In attaching the hook or loop to the staple the part is turned, with its trace-receiving portion projected forwardly and with the curved tongues directly over the upper end of the rounded portion of the staple, so that the channels within the tongues will receive said rounded portion of the staple. The hook or loop, as the case may be, is then slipped onto the staple into the position seen in Fig. III and turned to bring the trace-receiving portion to the rear into the position seen in Figs. I and IV, and the device is ready for use. The partition-leg 5 provides means for a high or low adjustment of the hook or loop. If a high adjustment be desired, the loop or hook is turned into the using position, with both the tongues located above the partition-leg 5 and the lower tongue resting upon the partition-leg 5, which prevents the loop or hook from dropping farther down. If a low adjustment be desired, the hook or loop is slipped farther down on the rounded portion of the staple when turned forwardly in the position shown in Fig. III, and then when the loop or hook is turned rearwardly the tongues assume a position above and below or straddling the partition-leg 5.

9 designates a stud projecting from one side of the staple-body 4. This stud is located opposite the division-leg 6 to serve as a stop for the hook or loop when dropped to their lower adjustment. In the absence of such stop-stud the lowermost tongue $7^a$ or $8^a$ of the hook or loop would be liable to descend into line with the division-leg 6 when the hook or loop is in forward position, and when draft is applied the strain would result in the breakage of said leg.

10 designates a spring having one end mounted on the shank of the upper leg 3 of the staple 2 and held to the face of the hame-body by said leg. This spring has a free end $10^a$ extending down beneath the upper leg 2 into proximity to the partition-leg 5. The object of this spring is to prevent the accidental turning of the hook or loop by its free end bearing against the rear of the hook or loop. In the absence of such spring the hook or loop would be free to swing on the body 4 of the staple. In such case the hook or loop is very liable to become thrown forwardly by the trace when the draft is relieved, as in traveling down a grade or in stopping suddenly. The result is that the hook or loop is thus permitted to become accidentally displaced from an upper adjustment in such forward throw of the hook or loop and, falling, descends to the lower adjustment or drops far enough to bring the lower tongues $7^a$ or $8^a$ into line with the partition-leg 5, so that when the draft strain begins again the lower tongue would catch against the partition-leg to result in the breakage of the said tongue or leg. The spring prevents the accidental forward throw of the hook or loop by the trace. It also prevents the parts from becoming accidentally disengaged from the staple in handling the hame when not in use, either when attached to harness or in shipping or handling in stores. The division-leg 6, located near the lower end of the staple, provides, in connection with the lower leg, staple-body, and hame-body, a pocket for the reception of the neck-yoke-strap-receiving ring 11.

By the employment of my improvement the trace-receiving attachments of hames are rendered adjustable vertically to suit the neck of the horse to which the hames are applied. It is also rendered possible to employ either a trace loop or hook attachment to the hames interchangeably, or when either a loop or a hook becomes unfit for use through wear it may be readily detached and another substituted in its place without the necessity of removing the receiving-staple.

I claim as my invention—

A trace-fastener for hames comprising a staple formed with a rounded body, and with upper, lower, and partition legs, a trace connection having curved tongues fitting the rounded body, and adapted to rest upon or embrace the partition-leg in its upper or lower adjusted position respectively, and the spring having one end mounted on the shank of the upper leg, adapted to be held to the face of the hame-body by the upper leg, and extending down beneath the upper leg into close proximity to the partition-leg, so as to adapt it to bear against the back of a curved tongue in either the upper or lower position of the trace connection; substantially as described.

ROY DODSON.

In presence of—
J. W. DUDLEY,
W. L. PIPKIN.